United States Patent
Cho et al.

(10) Patent No.: US 8,762,144 B2
(45) Date of Patent: Jun. 24, 2014

(54) METHOD AND APPARATUS FOR VOICE ACTIVITY DETECTION

(75) Inventors: Nam-gook Cho, Suwon-si (KR); Eun-kyoung Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 377 days.

(21) Appl. No.: 13/099,891

(22) Filed: May 3, 2011

(65) Prior Publication Data

US 2012/0022863 A1 Jan. 26, 2012

Related U.S. Application Data

(60) Provisional application No. 61/366,273, filed on Jul. 21, 2010.

(30) Foreign Application Priority Data

Oct. 11, 2010 (KR) .......................... 10-2010-0098828

(51) Int. Cl.
*G10L 15/20* (2006.01)

(52) U.S. Cl.
USPC .......................... 704/233; 704/214; 704/215

(58) Field of Classification Search
USPC ......... 704/208, 210, 213, 214, 215, 232, 233, 704/226, 253
See application file for complete search history.

(56) References Cited

U.S. PATENT DOCUMENTS

| 6,757,651 B2 * | 6/2004 | Vergin .......................... 704/233 |
| 6,889,187 B2 * | 5/2005 | Zhang .......................... 704/253 |
| 2007/0055508 A1 * | 3/2007 | Zhao et al. .................... 704/226 |
| 2010/0057453 A1 * | 3/2010 | Valsan .......................... 704/232 |

FOREIGN PATENT DOCUMENTS

| KR | 10-2002-023858 A | 3/2002 |
| KR | 10-2010-072842 A | 7/2010 |

\* cited by examiner

*Primary Examiner* — Huyen X. Vo
(74) *Attorney, Agent, or Firm* — Sughrue Mion, PLLC

(57) ABSTRACT

A method and apparatus for detecting voice activity are disclosed. The method of detecting voice activity includes: extracting a feature parameter from a frame signal; determining whether the frame signal is a voice signal or a noise signal by comparing the feature parameter with model parameters of a plurality of comparison signals, respectively; and outputting the frame signal when the frame signal is determined to be a voice signal. The apparatus includes a classifier module which extracts a feature parameter from a frame signal, and generating labeling information with respect to the frame signal by comparing the feature parameter with model parameters of a plurality of comparison signals; and a voice detection unit which determines whether the frame signal is a noise signal or a voice signal with reference to the labeling information, and outputting the frame signal when the frame signal is determined to be a voice signal.

25 Claims, 3 Drawing Sheets

METHOD AND APPARATUS FOR VOICE ACTIVITY DETECTION

CROSS-REFERENCE TO RELATED PATENT APPLICATION

This application claims the benefit of Korean Patent Application No. 10-2010-0098828, filed on Oct. 11, 2010, in the Korean Intellectual Property Office and U.S. Provisional Patent Application No. 61/366,273, filed on Jul. 21, 2010, in U.S. Patent and Trademark Office, the disclosures of which are incorporated herein, in their entireties, by reference. cl BACKGROUND 1. Field The exemplary embodiments relate to methods and apparatuses for voice activity detection. More particularly, the exemplary embodiments relate to methods and apparatuses for removing a noise signal from an input signal by comparing the input signal with model parameters with respect to various types of noise signals.

2. Description of the Related Art

Voice recognition technology for controlling various devices by using a voice signal has significantly advanced over the past few years. Voice recognition refers to a technology by which the linguistic meaning of a voice signal input to a hardware or software device or system is recognized and operations are performed according to the input signal being recognized as a voice signal.

SUMMARY

One or more exemplary embodiments provide methods and apparatuses for detecting voice activity, whereby various types of noise signals are removed.

According to an exemplary embodiment, there is provided a method of detecting voice activity, the method being performed in a Continuous Listening environment and comprising: extracting a feature parameter from a frame signal; determining whether the frame signal is a voice signal or a noise signal by comparing the feature parameter with model parameter of a plurality of comparison signals, respectively; and outputting the frame signal when the frame signal is determined to be a voice signal.

The method may further comprise calculating an energy value of the frame signal, wherein the extracting of a feature parameter comprises extracting a feature parameter from the frame signal when the energy value of the frame signal is equal to or greater than a reference value.

The method may further comprise determining the frame signal to be a silence signal when the energy value is smaller than the reference value, and not outputting the silence signal.

The extracting of a feature parameter may comprise extracting from the frame signal at least one of a short-time energy feature, a zero-crossing rate, spectral centroid, spectral rolloff, spectral flux, spectral flatness, and a Mel-frequency ceptral coefficient (MFCC).

The comparison signals may comprise first through n-th noise signals, where n is a natural number equal to or greater than 2, and a voice signal, wherein the determining of whether the frame signal is a voice signal or a noise signal comprises calculating likelihood values M1 through Mn, which denotes a degree of similarity between parameters of modeled characteristics of the first noise signal through the n-th noise signal and the feature parameter, and calculating a likelihood value Mn+1 indicating a degree of similarity between a parameter of modeled characteristics of the voice signal and the feature parameter.

The determining of whether the frame signal is a voice signal or a noise signal may comprise calculating a ratio of a difference value between Mn+1 and a second greatest likelihood value to a difference value between the second greatest likelihood and a third greatest likelihood, when Mn+1 is the greatest among the likelihood values M1 through Mn+1, generating a first voice signal displaying labeling information with respect to the frame signal when the ratio is greater than a critical value, and generating a second voice signal displaying labeling information with respect to the frame signal when the ratio is equal to or smaller than the critical value.

The determining of whether the frame signal is a voice signal or a noise signal may comprise, when the greatest value among M1 through Mn+1 is Mk (k is a natural number that is equal to or smaller than n), generating k-th noise signal displaying labeling information with respect to the frame signal.

The determining of whether the frame signal is a voice signal or a noise signal may comprise generating an index value which indicates whether the frame signal is a noise signal, a voice signal, or an uncertain voice signal, by using the labeling information.

The determining of whether the frame signal is a voice signal or a noise signal may comprise correcting the index value with respect to the frame signal, with reference to index values with respect to at least one of previous and subsequent frame signals of the frame signal, when the index value of the frame signal indicates that the frame signal is an uncertain voice signal.

The outputting of the frame signal may comprise outputting the frame signal when the index value indicates that the frame signal is a voice signal.

The outputting of the frame signal may comprise detecting a starting point and an end point of a voice with reference to the index value of the frame signal.

According to another aspect of the exemplary embodiments, there is provided an apparatus for detecting voice activity. The apparatus operating in a Continuous Listening environment and comprising: a classifier module extracting a feature parameter from a frame signal, and generating labeling information with respect to the frame signal by comparing the feature parameter with model parameters of a plurality of comparison signals; and a voice detection unit determining whether the frame signal is a noise signal or a voice signal with reference to the labeling information, and outputting the frame signal when the frame signal is determined as a voice signal.

According to another aspect of the exemplary embodiments, there is provided a computer readable recording medium having embodied thereon a program for executing a method of detecting voice activity. The method is performed in a Continuous Listening environment and comprises: extracting a feature parameter from a frame signal; determining whether the frame signal is a voice signal or a noise signal by comparing the feature parameters with one or more model parameters of a plurality of comparison signals, respectively; and outputting the frame signal when the frame signal is determined to be a voice signal.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
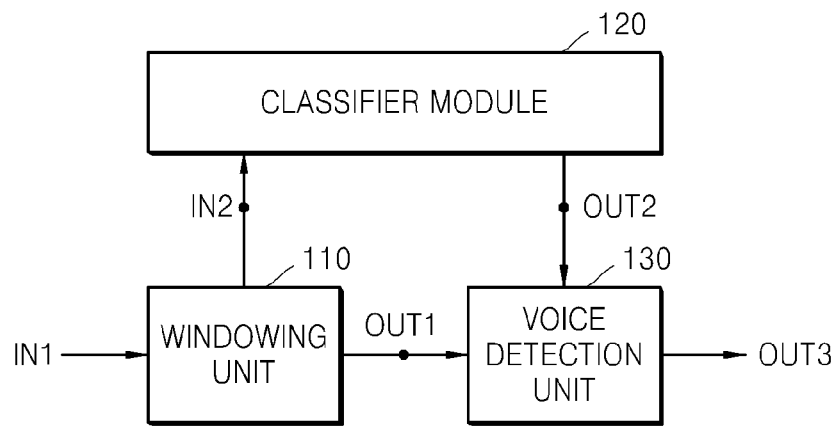
FIG. 1 is a block diagram illustrating a voice activity detection apparatus according to an embodiment of the present invention.

A voice recognition system is activated by a user via a physical user interface such as a keyboard, a mouse, a touch pad, a touch screen, or a microphone, etc. A desired user command is input as a voice signal. The voice recognition system is activated by an activation command input by the user via the user interface and then begins monitoring input signals. The voice recognition system recognizes a voice signal of a person among the input signals and begins operating according to the recognized voice signal.

However, the user may not be able to activate the voice recognition system using the physical user interface, for example, when the user is at or beyond a predetermined distance from the voice recognition system.

In consideration of such a situation, the exemplary embodiments provide methods of activating a voice recognition system through the use of a voice signal, instead of by manipulating a physical user interface, and apparatuses for performing the methods.

For the convenience of the user, a situation when a voice recognition system is automatically operated via a voice signal, without manipulation of a physical user interface, will be referred to as a Continuous Listening environment. In the Continuous Listening environment, start and end points of voice utterance cannot be anticipated. Thus, the voice recognition system has to continuously monitor input signals. Consequently, the voice recognition system may be inadvertently activated by various types of noise signals which are not in fact voice signals and may cause malfunctions of the voice recognition system. Thus, determining whether an input signal is a voice signal or a noise signal is an aspect of the exemplary embodiments.

The voice recognition system operating in the Continuous Listening environment may include a voice activity detection (VAD) apparatus, as well as a voice recognizer.

The VAD apparatus is positioned in front of the voice recognizer and performs voice recognition preprocessing. The VAD apparatus detects a section of voice activity from an input signal and sends a voice signal from the detected voice activity section to the voice recognizer. The VAD apparatus allows only a voice signal to be input to the voice recognizer in order to prevent the voice recognizer from operating in response to a noise signal instead of a voice signal.

The voice recognizer receives a voice signal received from the VAD apparatuses and analyzes the voice signal in order to perform various operations according to the received voice signal.

The voice recognition system may further include an auto activation module in front of the voice recognizer. The auto activation module extracts a feature parameter from a signal, and compares the extracted feature parameter with each of a plurality of voice parameters of speakers registered in advance or registered with a predetermined keyword. When the extracted feature parameter matches a registered voice parameter or a predetermined keyword, the auto activation module is activated and transmits the signal to the voice recognizer.

Hereinafter, preferred embodiments will be described with reference to the attached drawings.

FIG. 1 is a block diagram illustrating a voice activity detection apparatus 100 according to an exemplary embodiment.

Voice activity detection apparatus 100 of FIG. 1 is a type of enhanced VAD apparatus that detects a section of voice activity from an input signal. VAD apparatus 100 is positioned in front of a voice recognizer (not shown) and detects a section of voice activity from an input signal, and transmits only a voice signal from the voice activity section to the voice recognizer.

When an auto activation module (not shown) is positioned between voice activity detection apparatus 100 and the voice recognizer, VAD apparatus 100 detects a section of voice activity from an input signal, and then sends the voice activity section as a detected voice signal to the auto activation module. The auto activation module performs speaker/keyword recognition using the input signal transmitted from VAD apparatus 100, and then may transmit only a signal corresponding to a recognized speaker/keyword to the voice recognizer.

Alternatively, VAD apparatus 100 may be positioned between the auto activation module and the voice recognizer. In this situation, VAD apparatus 100 receives from the auto activation module a signal corresponding to a recognized speaker or keyword, and determines whether a noise signal is included in this signal. If a noise signal is included the signal, VAD apparatus 100 may remove the noise signal. VAD apparatus 100 may detect only a voice signal from the signal received from the auto activation module and transmit the detected voice signal to the voice recognizer, thereby preventing the voice recognizer from being inadvertently activated by a noise signal and not by a voice signal.

VAD apparatus 100, according to the current embodiment, includes a windowing unit 110, a classifier module 120, and a voice detection unit 130.

Windowing unit 110 divides an input signal IN1 into a predetermined number of frame units. In the current exemplary embodiment, predetermined frame unit may be 130 ms. Window unit 110 divides the input signal IN1 into frame units to generate a frame signal, and transmits the frame signal to classifier module 120 and voice detection unit 130.

Windowing unit 110 may determine the energy of the frame signal and transmit the frame signal to classifier module 120 and voice detection unit 130 only when the energy of the frame signal is equal to or greater than a predetermined reference value.

Classifier module 120 receives a frame signal from windowing unit 110 and extracts a feature from the frame signal. Classifier module 120 may extract various perceptual features and/or Mel-frequency cepstral coefficients (MFCC) from an input signal.

By using model parameters with respect to various types of comparison signals, classifier module 120 determines a signal from among the comparison signals that is most similar to the frame signal. To this end, classifier module 120 learns model parameters of noise signals by using a database of various types of comparison signals. According to the current exemplary embodiments, the comparison signals may include various types of noise signals. The various types of noise signals may be white noise or babble noise distributed over the entire frequency bands or unexpected noise that temporarily exists in a predetermined section.

In order to accurately determine whether an input signal is a voice signal, the comparison signals may further include a voice signal in addition to the noise signals.

Classifier module 120 may use classification techniques for various patterns, such as a Gaussian mixture model (GMM), a support vector machine (SVM), a hidden Markov model (HMM), etc.

Classifier module 120 matches patterns of the features extracted from the frame signal with model parameters of various, learned comparison signals in order to determine the comparison signals that the frame signal is most similar to. Classifier module 120 then generates labeling information, displaying a result of the determination. Classifier module 120 sends the labeling information to voice detection unit 130.

Voice detection unit 130 receives a frame signal from the windowing unit 110 in real time, and also receives labeling information regarding the frame signal from classifier module 120. Voice detection unit 130 generates, with reference to the labeling information, an index value displaying whether the frame signal is a noise signal, a voice signal, or an uncertain voice signal.

According to the current exemplary embodiment, voice detection unit 130 may correct an index value with respect to a current frame by using at least one of previous and subsequent frames of the current frame.

When the index value indicates that the current frame signal is a voice signal, voice detection unit 130 outputs the frame signal as an output signal OUT3. When the index value indicates that the current frame signal is not a voice signal, the voice detection unit 130 does not output the frame signal.

As described above, by extracting a feature from an input signal and comparing the feature with feature parameters of the comparison signals, the comparison signals that the input signal is most similar to may be determined.

In addition, according to the current exemplary embodiment, an input signal is output to the voice recognizer or the auto activation module only when the input signal is determined to be a voice signal, thereby preventing malfunctions of the voice recognizer arising from the presence of a noise signal in the Continuous Listening environment.

Figure 2:
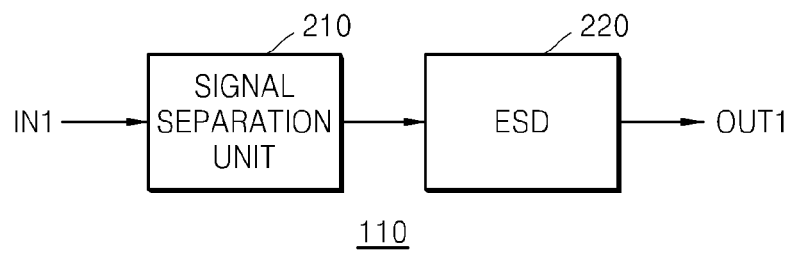
FIG. 2 is a block diagram illustrating a windowing unit of FIG. 1 according to an embodiment of the present invention.

FIG. 2 is a block diagram illustrating the windowing unit 110 of FIG. 1. Referring to FIG. 2, windowing unit 110 may include a signal separation unit 210 and an energy-based sound detector (ESD) 220.

Signal separation unit 210 separates an input signal IN1 into a predetermined number of frame units to generate a frame signal. Signal separation unit 210 sends the frame signal to ESD 220.

ESD 220 compares an energy value of the frame signal with a reference value. For example, when an i-th frame is assumed to be X(t), ESD 220 calculates $\|Xi(t)^2\|$ and determines whether $\|Xi(t)^2\|$ is greater than a previously set reference value. When $\|Xi(t)^2\|$ is equal to or greater then the previously set reference value, ESD 220 transmits frame signal Xi(t), as an output signal OUT1, to classifier module 120 and voice detection unit 130.

When $\|Xi(t)^2\|$ is smaller than the previously set reference value, the frame signal is highly likely to be a silence signal. Thus, instead of transmitting the frame signal Xi(t) to classifier module 120 and voice detection unit 130, EDS 220 may generate information that displays that frame signal Xi(t) is a silence signal and transmit only this information to voice detection 130.

As described above, according to the exemplary embodiment, a frame signal is processed only when an energy value of the frame signal is equal to or greater than a reference value, thereby omitting inadvertent signal processing of a frame signal that is determined to be EDS 220 a silence signal.

Figure 3:
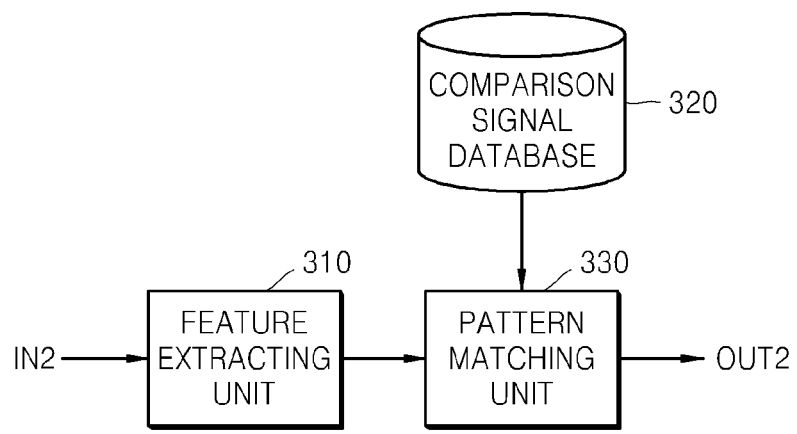
FIG. 3 is a block diagram illustrating a classifier module of FIG. 1 according to an embodiment of the present invention.

FIG. 3 is a block diagram illustrating classifier module 120. The classifier module 120 includes a feature extracting unit 310, a comparison signal database 320, and a pattern matching unit 330.

In FIG. 3, comparison signal database 320 is included in classifier module 120. However, the exemplary embodiments are not limited thereto. Alternatively, comparison signal database 320 may be positioned separately from classifier module 120. In this situation, comparison signal database 320 may be connected to classifier module 120 via a wired or wireless communication network.

Feature extracting unit 310 receives a frame signal from windowing unit 110 as an input signal IN2, and extracts a feature parameter from the input signal IN2.

Feature extracting unit 310 may extract, from the frame signal, various feature parameters displaying various perceptual features. The various perceptual feature parameters may include at least one of a spectral centroid denoting central values of frequency components when converting a signal into a frequency band, spectral rolloff denoting a frequency range including 85% of frequency components, spectral flatness denoting how energy is distributed in a frequency band, and spectral flux denoting a difference between frequency components of a current frame and frequency components of adjacent frames that are in front of and at the back of the current frame.

Alternatively, the perceptual feature parameters may include at least one of an energy size of a signal for a predetermined period of time and a zero crossing rate denoting a rate at which a signal value changes from positive to negative, or vice versa, in the time domain.

Alternatively, feature extracting unit 310 may extract a MFCC from an input signal as a feature parameter. The MFCC is a feature vector denoting an auditory sense of human beings, based on a fast Fourier transformation (FFT).

Feature extracting unit 310 extracts at least one of spectral centroid, spectral rolloff, spectral flux, spectral flatness, short-time energy feature, zero-crossing rate, and MFCC from the frame signal as a feature parameter, and sends the extracted feature parameters to pattern matching unit 330.

Comparison signal database 320 classifies model parameters with respect to a plurality of comparison signals, and stores the model parameters.

The plurality of comparison signals may include a plurality of noise signals and a plurality of voice signals. The noise signals may include unexpected noise that temporarily exists in a predetermined section. The unexpected noise may be, for example, door sounds, table sounds, chair sounds, sounds of manipulating a keyboard, sounds of bell or vibration, coughing sounds, music sounds, etc.

The noise signal may further include white noise or babble noise, distributed over the whole frequency bands, in addition to the unexpected noise.

Comparison signal database 320 may model patterns regarding the plurality of comparison signals using various pattern classification techniques such as a GMM, a SVM, or a HMM.

Pattern matching unit 330 receives model parameters of the comparison signals from comparison signal database 320 and compares the model parameters with feature parameters of a frame signal in order to determine the comparison signal that is similar to the frame signal.

In particular, pattern matching unit 330 may detect a maximum likelihood in order to calculate a degree of similarity between a frame signal and a plurality of comparison signals. Pattern matching unit 330 may compare feature parameters of a frame signal with model parameters of a plurality of comparison signals in order to perform pattern matching, and calculates a set of likelihood values denoting the degree of similarity.

According to the current exemplary embodiment, it is assumed that patterns of n noise signals, where n is a natural number of 2 or greater, and a pattern of one voice signal are stored in comparison signal database 320.

Pattern matching unit 330 calculates likelihood values M1 through Mn, which denotes a degree of similarity between parameters denoting modeled features of noise signals and the feature parameters of the frame signal received from feature extracting unit 310. Pattern matching unit 330 calculates a likelihood value Mn+1 denoting a degree of similarity between a parameter of a modeled feature of a voice signal and a feature parameter of a frame signal.

Pattern matching unit 330 generates labeling information denoting a type of frame signal by using values with the highest likelihood. In this situation, pattern matching unit 330 calculates a maximum value from among the values M1 through Mn+1. When the greatest value among the values M1 through Mn+1 is Mn+1, that is, when a feature parameter of a frame signal is most similar to a model parameter of a voice signal, pattern matching unit 330 calculates a difference value between Mn+1 and a second greatest likelihood value, and a difference value between the second greatest likelihood value, as well as a third greatest likelihood value.

Pattern matching unit 330 calculates a ratio of the difference between Mn+1 and the second greatest likelihood value to the difference value between the second greatest likelihood and the third greatest likelihood value, and determines whether the ratio is greater than a critical value. When the ratio is greater than the critical value, pattern matching unit 330 generates first voice signal displaying labeling information showing that the frame signal is a voice signal.

When the ratio of the difference value between Mn+1 and the second greatest likelihood value to the difference value between the second greatest likelihood value and the third greatest likelihood value is equal to or smaller than the critical value, pattern matching unit 330 generates second voice signal displaying labeling information to show that it is not clear whether the frame signal is a voice signal or a noise signal.

When the greatest value among M1 through Mn+1 is not Mn+1 but Mk (k is a natural number that is equal to or smaller than n), pattern matching unit 330 generates k-th noise signal displaying labeling information, showing that the frame signal is a k-th noise signal.

Pattern matching unit 330 generates one of the displayed labeling information for the first signal, the displayed labeling information for the second signal, and displayed labeled labeling information for the k-th noise signal with respect to each of the frame signals and sends the most similar frame signal to voice detection unit 130, as an output signal OUT2.

As described above, according to the current exemplary embodiment, by comparing the feature parameters of the frame signal and the model parameters of various types of comparison signals, the comparison signal that the frame signal is most similar to is determined, and labeling information may be generated according to a result of the determination.

Figure 4:
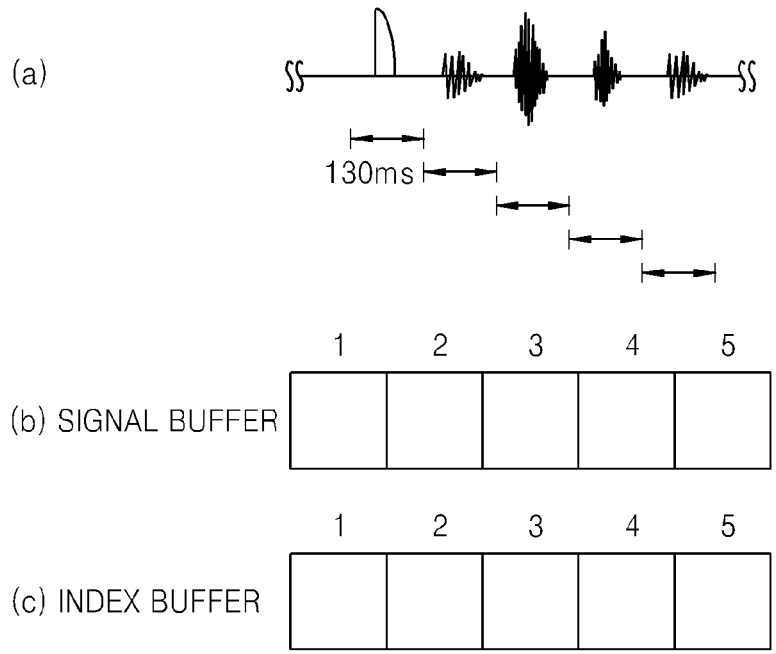
FIG. 4 illustrates a voice detection unit 130 that generates an index value with respect to a frame signal and corrects the index value, according to an embodiment of the present invention.

FIG. 4 illustrates voice detection unit 130 generating an index value with respect to a frame signal and correcting the index value, according to an exemplary embodiment.

FIG. 4A illustrates a waveform of an input signal on a time axis. A leftmost waveform denotes a noise signal, and a waveform after the noise signal denotes a voice signal.

Windowing unit 110 divides an input signal of FIG. 4($a$) into predetermined frame units, for example, in units of 130 ms, and transmits signals, starting first from a leftmost frame unit signal, to the classifier module 120 and the voice detection unit 130.

According to the exemplary embodiment, windowing unit 110 may calculate an energy value of a frame signal, and transmit the frame signal to classifier module 120 and voice detection unit 130 only when the energy value of the frame signal is equal to or greater than a reference value.

According to the exemplary embodiment, a signal buffer as illustrated in FIG. 4($b$) and an index buffer as illustrated in FIG. 4($c$) are included in voice detection unit 130. The index buffer and the signal buffer have the same number of spaces. In the signal buffer, frame signals received from the windowing unit 110 are filled starting from a first space, and the frame signals are moved every 130 ms by one space to the right. In the index buffer, an index value with respect to a corresponding frame signal is filled in a space corresponding to the space of the signal buffer filled with the frame signal.

Voice detection unit 130 receives labeling information from classifier module 120, generates an index value corresponding to the labeling information, and stores the generated index value in the index buffer.

For example, an index value indicating that a frame signal is a voice signal is set as 1, an index value indicating that a frame signal is either a noise signal or a silence signal is set as 0, and an index value indicating that it is not certain whether a frame signal is a voice signal or a noise signal, i.e., that a frame signal is an uncertain voice signal, is set as −2.

When the labeling information is displaying labeling information for a first voice signal, voice detection unit 130 stores the value 1, which the index value indicating that a frame signal is a voice signal. The value is stored in a space of the index buffer which corresponds to the space in the signal buffer in which the frame signal is stored.

When the labeling information is displaying labeling information for a second voice signal, voice detection unit 130 stores the value −2, the index value which indicates that it is not certain whether a frame signal is a voice signal or a noise signal. The value is stored in a space in the index buffer which corresponds to the space in the signal buffer in which the frame signal is stored.

When the labeling information is displaying labeling information for the k-th voice signal, voice detection unit 130 stores the value 0, the index value which indicates that a frame signal is a noise signal in a space of the index buffer. This value corresponds to the space in the signal buffer in which the frame signal is stored.

According to the exemplary embodiment, when a calculated energy of a frame signal is smaller than the reference value, windowing unit 110 transmits only the information displaying that the frame signal is a silence signal instead of the frame signal. Voice detection unit 130 may leave a space in the signal buffer in which the frame signal that is not input is to be left blank, and may fill a space in the index buffer with a 0, which corresponds to the space in the signal buffer, with the index value indicating that the frame signal is a silence signal.

After generating an index value by using labeling information, voice detection unit 130 may correct index values stored in the index buffer according to various steps, with reference to the index values of adjacent frame signals.

First, voice detection unit 130 may make a soft decision with respect to a frame signal whose index value is −2, that is, when it is unclear as to whether the frame signal is a voice signal or a noise signal. After making a soft decision, voice detection unit 130 may make an additional determination as to whether the frame signal is a voice signal, and may correct the index value of the frame signal based on a result of the determination.

For example, when a voice signal is a non-voice sound, pattern matching unit 330 might make a determination that a frame signal corresponding to an non-voice sound is a noise signal instead of a voice signal, because the energy of the unvoiced sound signal is small. In order to prevent such an error, voice detection unit 130 corrects the index value by first performing a soft decision.

For example, when the index values 1, 1, and −2 are each sequentially stored in first through third spaces of the index buffer, voice detection unit 130 may determine that a frame signal corresponding to a first syllable is a non-voice sound, and may correct the index values 1, 1, and −2 to 1, 1, and 1, respectively.

Alternatively, when the index values −2, 1, and 1 are each sequentially stored in first through third spaces of the index buffer, voice detection unit 130 may determine that a frame signal corresponding to a last syllable of a word is a non-voice sound, and may correct the index values −2, 1, and 1 to 1, 1, and 1, respectively.

When a person utters a sound, there are sections having high energy and sections having low energy, occurring alternately in the sound. Thus, when there is a signal in which it is not certain whether the signal is a voice signal or a noise signal between frame signals that are determined as voice signals, voice detection unit 130 may determine the frame signal as a voice signal. That is, when the index values sequentially stored in the index buffer are 1, −2, −2, and 1, voice detection unit 130 may determine that a frame signal included between voice signals is also a voice signal and correct the index values 1, −2, −2, and 1 to 1, 1, 1, and 1, respectively.

Voice detection unit 130 may correct the index values by making a soft decision, and then correct the index values again by performing smoothing.

Considering the situation where a voice signal does not change suddenly, and thus the possibility that a noise signal or a silence signal is included between voice signals is very low. When there is an index value other than 1 between the index values of 1, voice detection unit 130 may perform smoothing to correct the in between index value of other than 1 to 1. For example, when index values 1, 0, and 1 are each sequentially stored in first through third spaces of an index buffer, voice detection unit 130 determines that a frame signal that is between frames determined as voice signals is also a voice signal and may correct the index values 1, 0, and 1, to 1, 1, and 1, sequentially.

Voice detection unit 130 may make a determination that a section where a speech has started or where a speech has ended by using a predetermined number of index values.

For example, when index values 1, 1, and 0 are sequentially stored in first through third spaces of an index buffer, that is, when voice signals are consecutively input twice after a silence period, voice detection unit 130 may determine that speech has been uttered, and may correct the index values 1, 1, and 0 to 1, 1, and 1, respectively.

When an index value is 2, which occurs when a frame signal displays an end of a speech, and when index values 0, 0, and 1 are each sequentially stored in first through third spaces of an index buffer, that is, when two frame signals determined as a silence signal or a noise signal are consecutively input after a frame signal determined as a voice signal, voice detection unit 130 determines that speech has ended and may correct the index values 0, 0, and 1 to 2, 1, and 1, respectively.

Voice detection unit 130 controls the output of frame signals stored in a last space of a signal buffer, that is, in a fifth space in FIG. 4, according to an index value positioned in the last space of the index buffer.

When the index value positioned in the fifth space of the index buffer is 1, the voice detection unit 130 may determine that a frame signal corresponding to the index value is a voice signal, and outputs the frame signal in the fifth space of the signal buffer as an output signal OUT3. When the index signal positioned in the fifth space of the index buffer is 0, voice detection unit 130 determines that a frame signal corresponding to the index value is a silence signal or is a noise signal, and does not output the frame signal if it has been determined to be a silence signal. In addition, when the index value positioned in the fifth space of the index buffer is 2, voice detection unit 130 may determine that the speech has ended. Voice detection unit 130 detects a starting point and an end point of voice on a time axis, and may select a frame signal between the start point and the end point only and output the selected frame signal.

detection unit 130 determines whether speech has started or ended by referring to the index values and may generate information about start and/or end points of a speech utterance, for example, by generating time stamps, and output the same with the frame signal.

As described above, according to the current exemplary embodiment, with reference to the index values, voice detection unit 130 may suppress outputting of a frame signal which has been determined to be a noise signal or a silence signal, and allow only a frame signal determined as a voice signal to be output.

In addition, voice detection unit 130 may determine the start and/or end points of voice utterance, according to the index values, and generate information about the start and/or end points, as well as output the same.

Figure 5:
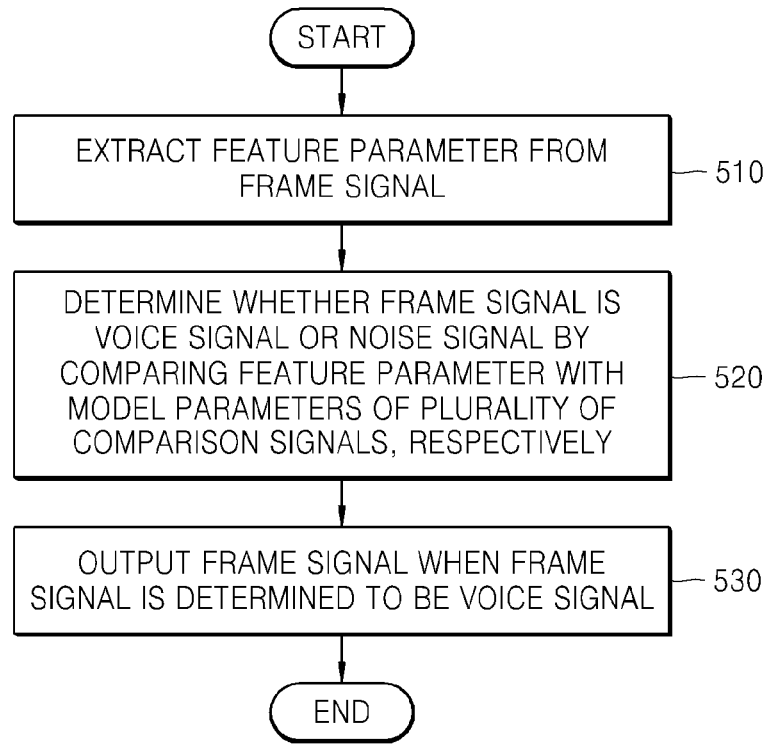
FIG. 5 is a flowchart illustrating a method of detecting voice activity according to an embodiment of the present invention.

FIG. 5 is a flowchart illustrating a method of detecting voice activity according to an exemplary embodiment. Referring to FIG. 5, VAD apparatus 100 extracts feature parameters from a frame signal in operation 510. VAD apparatus 100 may extract at least one of a short-time energy feature, zero crossing rate, spectral centroid, spectral rolloff, spectral flux, spectral flatness, and MFCC.

In operation 520, VAD apparatus 100 determines whether a frame signal is a voice signal or a noise signal by comparing the feature parameters with model parameters of a plurality of comparison signals.

In operation 530, when the frame signal has been determined to be a voice signal, VAD apparatus 100 outputs a frame signal. When the frame signal is determined by VAD apparatus 100 to be a noise signal or a silence signal, VAD apparatus 100 does not output the frame signal.

Figure 6:
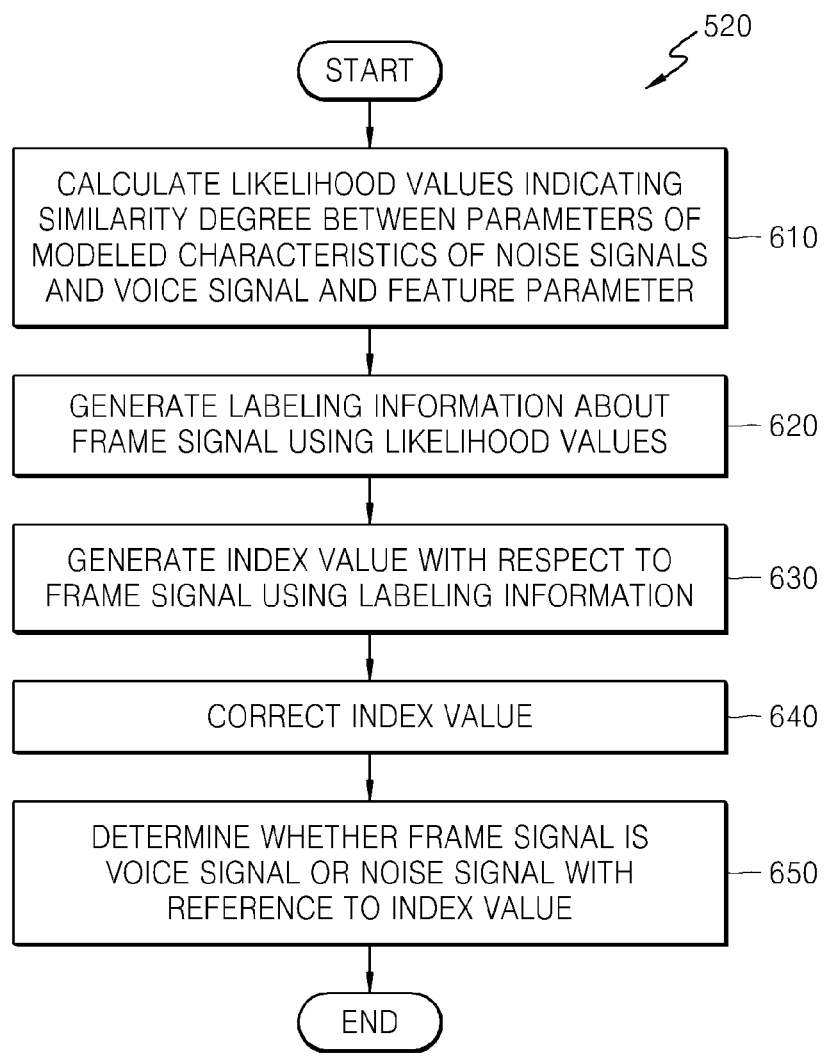
FIG. 6 is a flowchart illustrating operation 520 of FIG. 5 according to an embodiment of the present invention.

FIG. 6 is a flowchart illustrating operation 520 of FIG. 5 according to an exemplary embodiment. Referring to FIG. 6, VAD apparatus 100 matches patterns of parameters of modeled characteristics of noise signals and voice signals with patterns of the feature parameters extracted from the frame signal.

In operation 610, VAD apparatus 100 calculates likelihood values, respectively denoting degrees of similarity between the parameters of the modeled characteristics of the noise signals and the sound signals and the feature parameters. VAD apparatus 100 calculates likelihood values M1 through Mn, which denote a degree of similarity between parameters denoting modeled features of the first through n-th noise signals and a feature parameter, and calculates a likelihood value Mn+1 which denotes a degree of similarity between a parameter of modeled characteristics of a voice signal and a feature parameter.

In operation 620, VAD apparatus 100 generates, using the likelihood values, labeling information about the frame signal.

When a greatest value among the likelihood values is Mn+1, VAD apparatus 100 calculates a ratio of a difference value between Mn+1 and a second greatest likelihood value to a difference value between the second greatest likelihood value and a third greatest likelihood value. When the ratio is greater than a critical value, VAD apparatus 100 generates a first voice signal displaying labeling information. VAD 100 generates a second voice signal displaying labeling information when the calculated ratio is equal to or smaller than the critical value.

When the greatest value among the likelihood values is Mk (k is a natural number that is equal to or smaller than n), VAD apparatus 100 generates the k-th noise signal displaying labeling information, with respect to the frame signal.

In operation 630, VAD apparatus 100 generates, using the labeling information, index values with respect to the frame signal. VAD apparatus 100 generates an index value of 1 when the labeling information is displaying labeling information for the first voice signal. An index value of −2 is generated when the labeling information is displaying labeling information for the second voice signal. An index value 0 is generated when the labeling information is displaying labeling information for the k-th voice signal.

In operation 640, VAD apparatus 100 corrects the index values. VAD apparatus 100 performs a soft decision, smoothing, etc., with respect to the index values in order to correct the index values.

In operation 650, VAD apparatus 100 determines whether the frame signal is a voice signal or a noise signal, with reference to the corrected index values.

According to the exemplary embodiments, various types of noise signals may be removed from input signals so that only a voice signal is output.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description but by the appended claims, and all differences within the scope of the claims will be construed as being included in the present invention.

What is claimed is:

1. A method of detecting voice activity, comprising:
   extracting a feature from a frame; and
   determining, with an apparatus for detecting voice activity, whether the frame is a voice signal or a noise signal, wherein the determining comprises:
   comparing the feature with a plurality of models, respectively;
   calculating a plurality of likelihood values denoting a similarity between the feature and the plurality of models, respectively;
   calculating a plurality of difference values between the plurality of likelihood values; and
   determining whether the frame is a voice signal or a noise signal based on the plurality of difference values.

2. The method of claim 1, further comprising calculating an energy value of the frame,
   wherein the extracting a feature comprises extracting the feature from the frame when the energy value of the frame is equal to or greater than a reference value.

3. The method of claim 2, further comprising determining the frame to be a silence signal when the energy value of the frame has been determined to be smaller than the reference value, and not outputting a frame that has been determined to be a silence signal.

4. The method of claim 1, wherein the extracting a feature comprises extracting from the frame at least one of a short-time energy feature, a zero-crossing rate, spectral centroid, spectral rolloff, spectral flux, spectral flatness, and a Mel-frequency ceptral coefficient.

5. The method of claim 1, wherein the plurality of models comprise a plurality of models of first through n-th noise signals, where n is a natural number equal to or greater than 2, and a voice signal,
   wherein the calculating the plurality of likelihood values comprises calculating likelihood values M1 through Mn denoting a similarity between models of a first noise signal through the n-th noise signal and the feature, and calculating a likelihood value Mn+1 indicating a similarity between models of the voice signal and the feature.

6. The method of claim 5, wherein the determining whether the frame is a voice signal or a noise signal comprises, when the greatest value among M1 through Mn+1 is Mk (k is a natural number that is equal to or smaller than n), generating k-th noise signal displaying labeling information with respect to the frame.

7. The method of claim 5, wherein the calculating a plurality of difference values comprises calculating a ratio of a difference value between Mn+1 and a second greatest likelihood value, to a difference value between the second greatest likelihood value and a third greatest likelihood value when Mn+1 is the greatest among the likelihood values M1 through Mn+1, generating a first voice signal displaying labeling information with respect to the frame, when the calculated ratio is greater than a critical value, and generating a second voice signal displaying labeling information with respect to the frame signal when the calculated ratio is equal to or smaller than the critical value.

8. The method of claim 7, wherein the determining whether the frame is a voice signal or a noise signal comprises generating an index value indicating whether the frame is a noise signal, a voice signal, or an uncertain voice signal, by using the labeling information.

9. The method of claim 8, wherein the determining whether the frame is a voice signal or a noise signal comprises correcting the index value with respect to the frame with reference to index values, with respect to at least one of previous and subsequent frames of the frame, when the index value of the frame indicates that the frame is an uncertain voice signal.

10. The method of claim 9, further comprising outputting the frame as a voice signal when the frame is determined to be a voice signal when the index value indicates that the frame is a voice signal.

11. The method of claim 9, further comprising outputting the frame as a voice signal when the frame is determined to be a voice signal,
    wherein the outputting the frame comprises detecting a start point and an end point of a voice with reference to the index value of the frame.

12. The method of claim 1,
wherein the calculating a plurality of difference values comprising calculating a ratio based on the plurality of difference values between the plurality of likelihood values, and
wherein the determining whether the frame is a voice signal or a noise signal further comprises:
comparing the ratio to a critical value; and
generating labeling information based on a result of the comparing the ratio to the critical value.

13. The method of claim 12, wherein the determining whether the frame is a voice signal or a noise signal based on the ratio comprises:
determining whether the frame is a voice signal or a noise signal based on the labeling information.

14. An apparatus for detecting voice activity, comprising:
at least one processor which implements:
a classifier module which extracts a feature from a frame, calculating a plurality of likelihood values denoting a of similarity between the feature and a plurality of models, calculating a plurality of difference values between the plurality of likelihood values, and generating labeling information based on the plurality of difference values; and
a voice detection unit which determines whether the frame is a noise signal or a voice signal with reference to the labeling information.

15. The apparatus of claim 14, further comprising an energy-based sound detector which calculates an energy value of the frame,
wherein the energy-based sound detector transmits the frame to the classifier module and the voice detection unit when the energy value of the frame is equal to or greater than a reference value.

16. The apparatus of claim 15, wherein when the energy value is smaller than the reference value, the energy-based sound detector generates information indicating that the frame is determined to be a silence signal, and transmits the generated information to the voice detection unit.

17. The apparatus of claim 14, wherein the classifier module extracts from the frame at least one of a short-time energy feature, a zero-crossing rate, spectral centroid, spectral rolloff, spectral flux, spectral flatness, and a Mel-frequency ceptral coefficient.

18. The apparatus of claim 14, wherein the plurality of models comprise a plurality of models of first through n-th noise signals, where n is a natural number equal to or greater than 2, and a voice signal,
wherein the classifier module calculates the plurality of likelihood values by calculating likelihood values M1 through Mn denoting a degree of similarity between models of the first noise signal through the n-th noise signal and the feature, and calculates a likelihood value Mn+1 indicating a degree of similarity between a model of the voice signal and the feature.

19. The apparatus of claim 18, wherein the classifier module generates, when the greatest value among M1 through Mn+1 is Mk (k is a natural number that is equal to or smaller than n), displaying labeling information for the k-th noise signal with respect to the frame.

20. The apparatus of claim 18, wherein the classifier module calculates a ratio of a difference value between the Mn+1 and a second greatest likelihood value to a difference value between the second greatest likelihood value and a third greatest likelihood value when Mn+1 is the greatest among the likelihood values M1 through Mn+1, the classifier module generating a first voice signal displaying labeling information with respect to the frame when the ratio is greater than a critical value, and the classifier module generating a second voice signal displaying labeling information with respect to the frame, when the ratio is equal to or smaller than the critical value.

21. The apparatus of claim 20, wherein the voice detection unit generates an index value indicating whether the frame is a noise signal, a voice signal, or an uncertain voice signal, by using the labeling information.

22. The apparatus of claim 21, wherein the voice detection unit corrects the index value with respect to the frame, with reference to index values of at least one of previous and subsequent frame of the frame when the index value indicates that the frame is an uncertain voice signal.

23. The apparatus of claim 22, wherein the voice detection unit outputs the frame when the index value indicates that the frame is a voice signal.

24. The apparatus of claim 22, wherein the voice detection unit detects a starting point and an end point of a voice with reference to the index value.

25. A non-transitory computer readable recording medium having embodied thereon a program for executing a method of detecting voice activity, wherein the program, when executed on a processor of a computer, causes the computer to implement the method, the method comprising:
extracting a feature from a frame; and
determining whether the frame is a voice signal or a noise signal,
wherein the determining comprises:
comparing the feature with a plurality of models, respectively;
calculating a plurality of likelihood values denoting a similarity between the feature and the plurality of models;
calculating a plurality of difference values between the plurality of likelihood values; and
determining whether the frame is a voice signal or a noise signal based on the plurality of difference values.

* * * * *